July 3, 1951 O. F. CHENEY 2,558,820

CIRCUIT FOR PREVENTING SHOCK IN TRANSFORMERLESS RADIO-PHONOGRAPHS

Filed Oct. 30 1947

INVENTOR.
OLIVER F. CHENEY

BY

Brown, Denk & Synnestvedt

AGENTS

Patented July 3, 1951 2,558,820

UNITED STATES PATENT OFFICE 2,558,820

CIRCUIT FOR PREVENTING SHOCK IN TRANSFORMERLESS RADIO-PHONOGRAPHS

Oliver F. Cheney, Philadelphia, Pa., assignor to Philco Corporation, Philadelphia, Pa., a corporation of Pennsylvania Application October 30, 1947, Serial No. 783,116

5 Claims. (Cl. 179—100.11)

Figure 1:
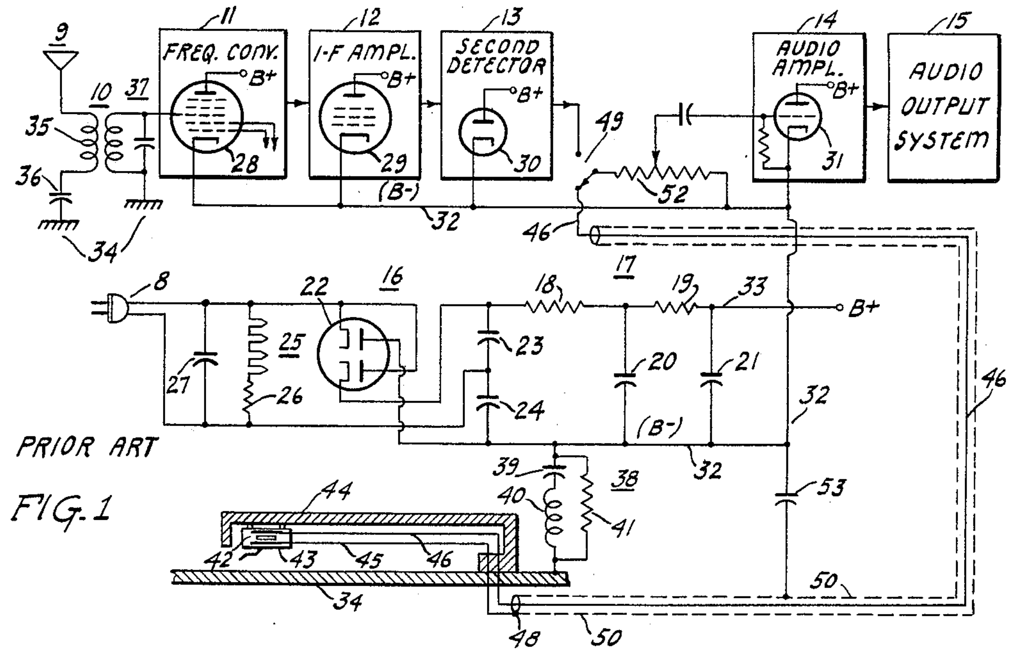

The invention herein described and claimed relates to phonographs, particularly radio-phonograph combinations, of the types which are adapted to obtain their operating power from supply mains without the use of an interposed transformer. While the invention is applicable to phonographs having an audio amplifier stage but no radio-receiver stages, the invention is particularly adapted to radio-phonographs and it will be convenient to describe the invention in the latter environment.

In many alternating-current radio-phonograph combinations, a transformer is, of course, employed. Where employed, the transformer serves the purpose, not only of supplying the desired voltage to the rectifier-filter circuit, but also of isolating the vacuum-tube circuits from the A.-C. mains. Hence, if and when an accidental short circuit occurs within the receiver, the receiver circuits are in an isolated condition, so far as the supply mains are concerned, and a flow of large amperage current does not occur within the apparatus. Person and property are therefore not threatened with serious injury.

In many types of radio-phonograph combinations, however, no line transformer is employed and the power-supply mains are connected directly to the vacuum-tube circuits by way of elements whose impedance to supply-line frequencies is very low, e. g., of the order of 1000 ohms or less. Included among the types of radio-phonographs which employ no transformer, are direct-current apparatus, transformerless alternating-current apparatus, and direct-current/alternating-current apparatus, the latter being operable from either D.-C. or A.-C. supply mains.

In such apparatus, employing no line transformer, it is dangerous to life and property to connect the vacuum-tube circuits conductively to the chassis of the apparatus since the line plug, in at least one, and in some cases both, of its two possible socket positions would connect the full, or almost full, line voltage to the chassis. Nevertheless, from a wiring standpoint, it is desirable to use the chassis as a common return for certain currents, as for example, for the radio-frequency and intermediate-frequency currents of a radio-phonograph. It is therefore common practice, in transformerless types of apparatus, to connect the radio-frequency and intermediate-frequency circuits capacitively to the chassis. The value of the capacitance employed is necessarily a compromise between opposing considerations, for the connection must provide a path of relatively low impedance to radio-frequency and/or intermediate-frequency currents, while for direct currents or for currents of supply-line frequency (50–60 cycles per second), the path provided must offer a sufficiently high impedance to prevent a flow of line current of such magnitude as to be dangerous to life and property. The requirements in this regard are established in the United States by the Underwriters' Laboratories, Inc.

As presently defined by Underwriters' Laboratories, Inc., in the "Standard for Power-Operated Radio Receiving Appliances," sixth edition, November, 1942, shock hazard is considered to exist at an exposed live part if the open circuit potential is more than 25 volts and the current, with a 1500 ohm load, is more than 5 milliamperes. A live part is considered to be exposed if it is subject to handling in normal use, not including servicing. A phonograph pick-up arm is within this definition and is consequently considered to be an exposed live part.

In prior art transformerless radio-phonographs, the requirements of the Underwriters' Laboratories as to shock hazard have been met by constructions which entailed a sacrifice of quality of performance.

The present invention provides a transformerless radio-phonograph combination which, while meeting the underwriters' requirements as to shock hazard, provides improved quality of performance. The improvement in performance includes a substantial reduction in objectionable A.-C. hum, i. e., a substantial reduction in the audible hum of supply-line frequency, or of frequencies related harmonically thereto, which is heard in the background of a received radio program or phonograph-record reproduction.

It is an object of this invention to provide an improvement in transformerless phonographs and radio-phonograph combinations.

It is another object of this invention to provide an improved transformerless phonograph or radio-phonograph combination which, while meeting the requirements of the Underwriters' Laboratories, Inc. as to shock hazard, reproduces substantially less A.-C. hum than do similar prior art apparatus.

Figure 2:
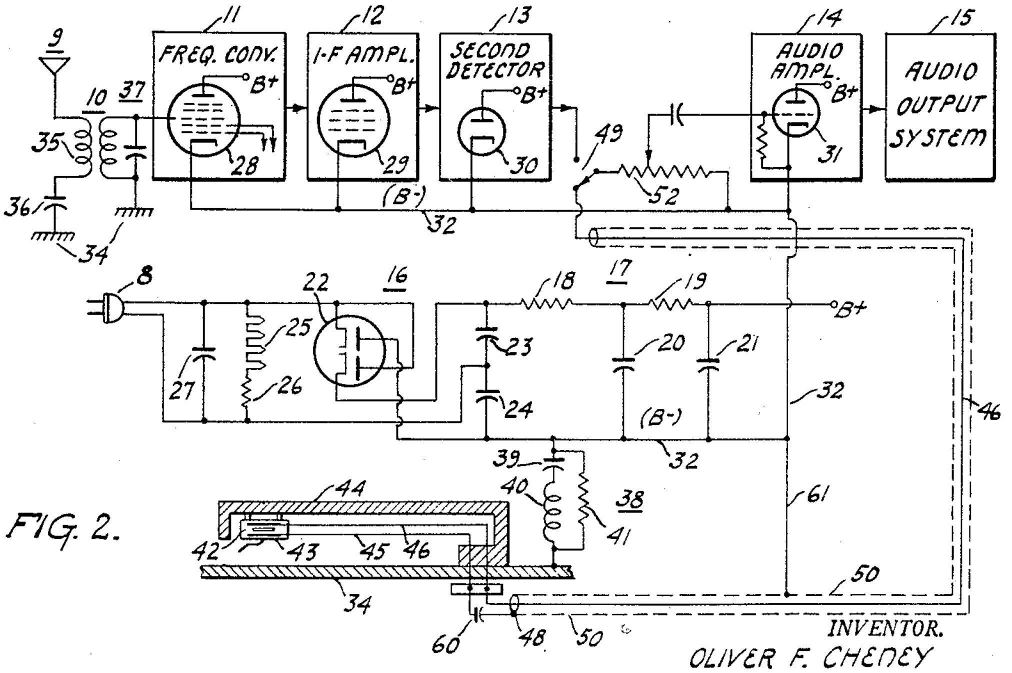

These and other objects, features and advantages of the present invention will become clear from a consideration of the following detailed description and of the accompanying drawings wherein:

Figure 1 is a representation, partly schematic, partly diagrammatic, of a transformerless radio-phonograph combination of the prior art; and Figure 2 illustrates a transformerless radio-phonograph combination which includes the improvement provided by the present invention.

Referring now to Figure 1, there is shown a transformerless A.-C. superheterodyne radio-phonograph, employing the means of the prior art, and comprising an antenna 9, an antenna transformer 10, a combined first detector-oscillator or frequency converter 11, an intermediate-frequency amplifier 12, a combined second detector and automatic-volume-control 13, an audio amplifier 14, and an audio output system 15.

The power-supply means shown in Figure 1 comprises a line plug 8, an alternating-current rectifier and voltage-doubling circuit 16, and a filter system 17. Filter system 17 includes series resistances 18 and 19 and shunt capacitors 20 and 21. Voltage-doubling circuit 16 is conventional and includes a double-diode vacuum tube 22 and capacitors 23 and 24. Capacitors 23 and 24 are charged on alternate half cycles of supply-line voltage, and are so arranged that the voltages developed thereacross are additive. The capacitors are ordinarily of the electrolytic type and of high capacity, e. g. 15 microfarads or more. Cathode heaters 25 of the various vacuum tubes are serially connected across the supply mains, and one or more ballast resistors 26 may be included in series therewith, if necessary or desired. A small capacitor 27 is ordinarily connected across the mains for the purpose of by-passing radio-frequency currents.

It will be observed that in the transformerless A.-C. radio-phonograph shown in Figure 1, low-impedance connections obtain between the common cathode conductor 32 (B—) and the high potential, i. e., ungrounded, side of the supply mains. For, when the upper prong of line-plug 8 is connected to the ungrounded side of the supply mains, there is a low-impedance conductive connection, on the negative half-cycles of supply-mains voltage, between the B— conductor 32 and the high potential side of the supply mains, by way of the upper diode of tube 22. And, when the lower prong of line-plug 8 is connected to the ungrounded side of the supply mains, there is a low impedance capacitive connection, between the B— conductor 32 and the high potential side of the supply mains, by way of capacitor 24.

In modern radio receivers and radio-phonograph combinations, it is common practice to mount various components on a metal chassis or housing represented generally as 34. The chassis also serves as an electrically conductive member having a common potential to which certain of the radio receiver circuits may be connected. Thus, in Figure 1 of the drawing, the primary winding 35 of the antenna transformer 10 has been returned, through capacitor 36, to the chassis 34; and the R.-F. tank circuit 37, on the secondary side of the antenna transformer 10, is also connected directly to the chassis 34. The chassis may, or may not, be grounded, i. e., connected to earth. Ordinarily, however, the chassis is not grounded.

Since, as has already been indicated, one side of the electric supply mains is ordinarily grounded, and since the B— conductor 32 is connected, by way of a low impedance element, to the ungrounded or high potential side of the mains, it would be hazardous to connect the B— conductor 32 directly to the chassis 34, for it would then be possible for substantially the full mains voltage to exist between the chassis and ground. On the other hand, in order to maintain stability and efficiency of operation, with respect to the radio-phonograph apparatus, it is necessary that a connection be provided between certain of the apparatus circuits and the chassis. Such connection is required to offer low impedance to the radio-frequency currents extant in the apparatus, but high impedance to currents of supply-line frequency. While the coupling may comprise a capacitor of suitable size connected between the B— conductor 32 and the chassis 34, it is preferable, as shown in the patent to Albright, No. 2,261,203, issued November 4, 1941, and assigned to the assignee of the present invention, to employ a frequency-discriminating network which may comprise a number of dissimilar reactive elements arranged to provide a low impedance path for the various high frequency currents employed in the apparatus while offering high impedance to low frequency and direct currents. Such a frequency-discriminating network is represented in Figure 1 by network 38 comprising serially-connected capacitor 39 and choke 40 and shunt resistor 41. Resistor 41 is of large value and serves to provide a return, from chassis to B—, for D.-C. leakage currents.

The arrangement shown in the Albright patent, referred to above, meets, in a very satisfactory manner, the shock hazard requirements of transformerless radio receivers without impairment to the quality of performance. But transformerless radio-phonographs involve a complication, not present in radio receivers, which prevents the frequency-discriminating network of the Albright patent from being a complete solution to the shock hazard problem, so far as radio-phonographs are concerned.

As shown diagrammatically in Figure 1, a conventional radio-phonograph combination includes a phonograph pickup element 42 which is ordinarily enclosed in a metal housing 43; and the housing 43 is ordinarily supported in depending position from a metal tone arm 44 mounted upon the chassis 34. The phonograph pickup 42 illustrated in Figure 1 comprises a conventional, high impedance crystal element.

The upper electrode of the crystal element 42 is shown in Figure 1 to be connected, by way of conductor 46, radio-phono switch 49 (upper right portion of Figure 1), and volume control 52, to the control grid of audio amplifier tube 31. It is ordinarily necessary, or at least desirable, to shield conductor 46 from the ambient electrostatic fields established by the power supply lines, particularly by the supply lines located within the radio-phonograph cabinet, as otherwise a voltage of supply-line frequency, and of substantial magnitude, would appear on the control grid of tube 31, and an intolerable amount of A.-C. hum would be reproduced in the audio output system 15. In the arrangement shown in Figure 1, the necessary electrostatic shielding for conductor 46 is provided by employing a suitable shielded line 48, the inner conductor of which, being connected to pickup-conductor 46, constitutes a continuation thereof.

The lower electrode of crystal pickup 42 is returned to the cathode of audio amplifier tube 31 by way of conductor 45, the outer conductor or shield portion 50 of the shielded line 48, capacitor 53, and the common B— conductor 32.

Excluding shock hazard considerations, capacitor 53 is desirably of relatively large size since its principal function is to return to the B— conductor 32 voltages of supply-line frequency derived from the ambient electrostatic fields and developed in the outer conductor 50 of shielded line 48. However, if capacitor 53 were large, a shock-hazard condition would obtain if the lower electrode of pickup 42 were to become shorted to the housing 43. For then, the impedance between the tone arm 44 and the B— conductor 32 would be lowered by the establishment of an additional shunt path which includes capacitor 53. A current of shock-hazard magnitude could then flow from the high potential, i. e., ungrounded, side of the supply mains through the low impedance of tube 22 or of capacitor 24, depending upon the socket position of line-plug 8, to the B— conductor 32 through the parallel paths, to be described, interconnecting the B— conductor 32 and the tone arm 44, and then, assuming the operator to be in contact with tone arm 44, through the operator to ground. One of the parallel paths referred to interconnects the B— conductor 32 with tone arm 44 only when a short circuit occurs, as at the lower electrode of pickup 42. This path comprises capacitor 53, the outer conductor 50 of shielded line 48, conductor 45, the lower electrode of pickup 42, the assumed short circuit, housing 43 and tone arm 44. The other parallel path, interconnects the B— conductor with chassis, and hence with tone arm 44, entirely independently of the occurrence of a short circuit. This path comprises network 38, chassis 34 and tone arm 44.

The occurrence of a short circuit between conductor 45 or the lower electrode of crystal pickup 42 and housing 43 is required to be assumed, under the underwriters' regulations, for the dimensions of the spacings are small and experience has shown short circuits to occur there rather frequently. In prior art radio-phonograph circuits, the situation has been met, satisfactorily so far as shock hazard considerations are concerned, but unsatisfactorily so far as radio receiver performance is concerned, by selecting values for network 38 and for capacitor 53 such that the combined impedance of the parallel paths at supply-line frequency is sufficiently high to prevent the flow of currents of shock hazard magnitude when a short circuit occurs. This treatment of the problem requires that the impedance of network 38 be substantially higher in radio-phonographs than in radio receivers, since in radio-phonographs the possibility of having capacitor 53 in shunt with network 38 must be assumed. In radio receivers this situation does not exist, there being no tone arm to be contacted by the operator and no phonograph pickup to be shorted to its housing.

As has been indicated, the arrangement employed by the prior art and illustrated in Figure 1, is unsatisfactory with respect to performance, particularly the performance of the radio-receiver portion of a radio-phonograph combination, one reason being that the impedance of the return path for the R.-F. and I.-F. currents from chassis to cathode is too high to permit the required gains to be obtained. The situation is complicated by the fact that, while for shock hazard considerations capacitor 53 must be assumed to complete a path between the B— conductor 32 and the chassis 34 and to be in shunt with network 38, such a shunt path will ordinarily not exist, since ordinarily there will be no short circuit between pickup 42 and housing 43.

Stated another way, network 38 will ordinarily constitute the only connection between the B— conductor 32 and chassis 34. Nevertheless, each of the networks 38 and 53 individually must have a sufficiently high impedance to permit, in the event of a short circuit at pickup 42, their joint presence between chassis 34 and conductor 32 without establishing a shock hazard condition. To meet this requirement, the impedance of capacitor 53 at supply-line frequencies is so high that an objectionable A.-C. hum is inevitable in the audio output system.

In accordance with the present invention, the conventional radio-phonograph circuit, illustrated in Figure 1 and described above, is modified in the manner shown in Figure 2. The circuit of Figure 2 is similar in most respects to the circuit of Figure 1, like components being identified by like reference numerals.

In the circuit of Figure 2, an audio coupling capacitor 60 is placed in series with pickup conductor 45 between the phonograph pickup 42 and the shield 50 of shielded line 48; and shield 50 is connected to the B— conductor 32 by means having low impedance to supply-line frequency, preferably by a direct connection, as shown in Figure 2 by connection 61. Capacitor 60 is desirably located in a position which is inaccessible to the operator during normal usage of the radio-phonograph. The principal function of capacitor 60 is to prevent a flow of current of shock-hazard proportion should a short circuit, as previously described in connection with Figure 1, occur. For, when the short circuit occurs, a path is completed, in shunt with network 38, between chassis and B—, said path being comprised of tone arm 44, housing 43, the lower electrode of the crystal pickup 42, conductor 45, capacitor 60, the shield 50 of shielded line 48, and connection 61. Capacitor 60 is therefore required to be of such size as to offer the necessary high impedance to currents of supply-line frequency. And capacitor 60 is, of course, constructed to meet the requirement of the Underwriters' Laboratories regarding the dielectric strength of capacitors employed for the elimination of shock hazard, the present requirement being that the capacitor shall be capable of withstanding without breakdown, for a period of one minute, a sixty-cycle alternating potential of 900 volts.

Capacitor 60, like capacitor 53 in Figure 1, is in series with crystal pickup 42 in the grid-cathode circuit of audio-amplifier tube 31. Hence, the value of capacitor 60 must be so chosen that its impedance, while adequately high for shock-hazard purposes, is, at most of the audio frequencies, low relative to the impedance of the phonograph pickup 42. It is consequently advantageous to employ a high impedance phonograph pickup, as for example, a crystal pickup. Then, at the lowest audio frequenies, i. e. below one hundred cycles, the impedance of capacitor 60 will but approach that of the high impedance pickup 42 so that the quality of the audio output will be affected only to an inappreciable extent. In practice the capacitance of the capacitor 60 may conveniently be of the order of 0.01 microfarad. The impedance of such a capacitor at 60 cycles is approximately 260,000 ohms.

Since capacitor 60, as above indicated, is of sufficiently high impedance at supply-line frequency to prevent a shock-hazard condition from obtaining in the event a short circuit occur at the phonograph pickup, it is not necessary, in the improved circuit of Figure 2, to insert a shock-preventing impedance between the shield or outer conductor 50 of the shielded line 48 and the B— conductor 32. On the contrary, the shield 50 may be joined directly and conductively to the B— conductor, as is shown in Figure 2 by connection 61. The improvement derived from such a connection is important, for the appreciable A.-C. hum voltage developed across capacitor 53 in the prior art circuit of Figure 1, is entirely eliminated.

Observe that in the prior art circuit, capacitor 53 was required to perform three functions, namely; (a) to offer sufficiently high impedance to currents of supply-line frequency to prevent a flow of current of shock-hazard magnitude between B— and chassis in the event the lower electrode of phonograph pickup 42 becomes shorted to housing 43; (b) to offer sufficiently low impedance to currents of supply line frequency to exclude substantially hum voltages from the grid of audio-amplifier tube 31, or at least to reduce such hum voltages to a minimum value; and (c) to offer reasonably low impedance to audio frequencies, capacitor 53 being in series with the phonograph pickup 42 in the grid-cathode circuit of audio-amplifier tube 31.

The requirements of functions (a) and (b) above are in serious conflict, with respect to the optimum value of capacitor 53. Moreover, the shock-hazard requirement does not permit selection of a compromise value which will meet satisfactorily both the shock-hazard requirement and the reduction-of-hum-voltage requirement. And, since the shock-hazard condition cannot be permitted to exist, a value is unavoidably selected for capacitor 53 which results in excessive hum.

In the circuit of the present invention, on the other hand, capacitor 60 is required to perform but two of the three functions described above with respect to capacitor 53. Capacitor 60 is not required to perform function (b), i. e., is not required to offer such low impedance to currents of supply-line frequency as to prevent the development of hum voltages thereacross. The reason is that capacitor 60 is not located in the circuit between the shield 59 which is the source of the hum voltages and the B— conductor 32. Hence, capacitor 60 is merely required to perform functions (a) and (c) described above; and the requirements of these functions are not so opposing that a satisfactory compromise value cannot be selected.

In the claims the structure employed to energize the phonograph or associated audio amplifier is defined as low impedance means for energizing the tubes from electric supply mains, said low impedance means including a conductive connection between the supply mains and the common cathode conductor or associated audio amplifier. This definition is intended to limit the environment of my invention to a type of phonograph apparatus in which no line transformer is employed, commonly referred to as a transformerless type of phonograph apparatus.

Having described my invention, I claim:

1. In a radio-phonograph comprising a plurality of vacuum tubes having at least anode, cathode and control grid electrodes; a phonograph pickup; means coupling said pickup to the cathode and control grid electrodes of one of said tubes, said means including a first conductor and a second conductor, a portion of said first conductor being in the form of and functioning as a shield for at least a portion of said second conductor; a conductor common to the cathode circuits of said tubes; low impedance means for energizing said tubes from electric supply mains, said means including a conductive connection between said supply mains and said common cathode conductor; an electrically conductive chassis upon which various components of said radio-phonograph are mounted; and frequency-discriminating means connected between said common cathode conductor and said chassis, said frequency-discriminating means having a relatively low impedance to currents of radio and intermediate frequency and a relatively high impedance to currents of supply-mains frequency, said impedance at supply-mains frequency being sufficient to prevent a flow of current of shock-hazard proportion between said common cathode conductor and said chassis in the event that supply-mains voltage is impressed therebetween; the improvement which comprises the provision of a connection between said common cathode conductor and said shield, said connection offering sufficiently low impedance to supply-mains frequency to prevent the development across said connection of voltages of appreciable magnitude at supply-mains frequency; and a capacitor connected in series with said first conductor between said phonograph pickup and said shield, said capacitor having such value that its impedance at most audio frequencies is low relative to the impedance of said phonograph pickup, said capacitor impedance being sufficiently high at supply-line frequency to prevent a flow of current of shock hazard proportion therethrough in the event that supply-line voltage is impressed thereacross.

2. In a radio-phonograph comprising a plurality of vacuum tubes having at least anode, cathode and control grid electrodes; a phonograph pickup; means coupling said pickup to the cathode and control grid of one of said tubes, said means including a first conductor and a second conductor, a portion of said first conductor being in the form of and functioning as a shield for at least a portion of said second conductor; a conductor common to the cathode circuits of said tubes; low impedance means for energizing said tubes from electric supply mains, said means including a conductive connection between said supply mains and said common cathode conductor; an electrically conductive chassis upon which various components of said radio-phonograph are mounted; and a frequency-discriminating network connecting said common cathode conductor to said chassis, said network having a relatively low impedance to currents of radio and intermediate frequency and a relatively high impedance to currents of supply-mains frequency, said impedance at supply-mains frequency being sufficient to prevent a flow of current of shock-hazard proportion between said common cathode conductor and said chassis in the event that supply-mains voltage is impressed therebetween; the improvement which comprises the provision of a low impedance conductive connection between said common cathode conductor and said shield, said connection offering sufficient low impedance to supply-mains frequency to prevent the development across said connection of voltages of appreciable magnitude at supply-mains frequency; and a capacitor connected in series with said first conductor between said phonograph pickup and said shield, said capacitor having such value that its impedance at most audio frequencies is low relative to the impedance of said phonograph pickup, said capacitor impedance being sufficiently high at supply-line frequency to prevent a flow of current of shock hazard proportion therethrough in the event that supply-line voltage is impressed thereacross.

3. In an electric phonograph having at least one stage of audio amplification; a tube having at least anode, cathode and control electrodes; a phonograph pickup; means coupling said pickup to said tube, said means including a first conductor and a second conductor, a portion of said first conductor being in the form of and functioning as a shield for at least a portion of said second conductor; low impedance means, including conductors to said cathode and anode electrodes, for energizing said tube from electric supply mains, said means including a conductive connection between said supply mains and said cathode conductor; an electrically conductive chassis upon which various components of said phonograph are mounted; and frequency-discriminating means connected between said cathode conductor and said chassis, the impedance of said frequency-discriminating means at most audio frequencies being low relative to the impedance of said phonograph pickup, the impedance of said frequency-discriminating means at supply-mains frequency being sufficiently high to prevent a flow of current of shock-hazard proportion between said cathode conductor and said chassis in the event that supply-mains voltage is impressed therebetween; the improvement which comprises the provision of a connection between said cathode conductor and said shield, said connection offering sufficiently low impedance to supply-mains frequency to prevent the development across said connection of voltages of appreciable magnitude at supply-mains frequency; and a capacitor connected in series with said first conductor between said phonograph pickup and said shield, said capacitor having such value that its impedance at most audio frequencies is low relative to the impedance of said phonograph pickup, the impedance of said capacitor being sufficiently high at supply-line frequency to prevent a flow of current of shock hazard proportion therethrough in the event that supply-line voltage is impressed thereacross.

4. In a radio-phonograph comprising a plurality of vacuum tubes having at least anode, cathode and control grid electrodes; a phonograph pickup; means coupling said pickup to the cathode and control grid of one of said tubes, said means including a first conductor and a second conductor, a portion of said first conductor being in the form of and functioning as a shield for at least a portion of said second conductor; a conductor common to the cathode circuits of said tubes; low impedance means for energizing said tubes from electric supply mains, said means including a conductive connection between said supply mains and said common cathode conductor; an electrically conductive chassis upon which various components of said radio-phonograph are mounted; and a frequency-discriminating network connecting said common cathode conductor to said chassis, said network having a relatively low impedance to currents of radio and intermediate frequency and a relatively high impedance to currents of supply-mains frequency, said impedance at supply-mains frequency being sufficient to prevent a flow of current of shock-hazard proportion between said common cathode conductor and said chassis in the event that supply-mains voltage is impressed therebetween; the improvement which comprises the provision of a low impedance conductive connection between said common cathode conductor and said shield, said connection offering sufficiently low impedance to supply-mains frequency to prevent the development across said connection of voltages of appreciable magnitude at supply-mains frequency; and a capacitor connected in series with said first conductor between said phonograph pickup and said shield, said capacitor being so located as to be inaccessible to the operator in normal usage of said radio-phonograph, said capacitor having such value that its impedance at most audio frequencies is low relative to the impedance of said phonograph pickup, said capacitor impedance being sufficiently high at supply-line frequency to prevent a flow of current of shock hazard proportion therethrough in the event that supply-line voltage is impressed thereacross.

5. In an electrical record player adapted to be connected to an associated audio amplifier which is energized from electric supply mains through low impedance means, said means including a conductive connection between said supply mains and said amplifier; a phonograph pickup; and means for connecting said pickup to the input circuit of said associated audio amplifier, said means including a first conductor for connecting one terminal of said pickup to a first input terminal of said associated audio amplifier, a shield for at least a portion of said first conductor, means for connecting said shield to a second input terminal of said associated audio amplifier, a second conductor connected to the other terminal of said pickup, and a capacitance connecting said second conductor to said shield, the impedance of said capacitance at most audio frequencies being low relative to the impedance of said phonograph pickup, the impedance of said capacitance at supply-line frequency being sufficiently high to prevent a flow of current of shock-hazard proportion therethrough in the event that supply-line voltage is impressed thereacross.

OLIVER F. CHENEY.

REFERENCES CITED

The following references are of record in the file of this patent:

UNITED STATES PATENTS

| Number | Name | Date |
|---|---|---|
| 2,252,057 | Blessing | Aug. 19, 1941 |